United States Patent
Himmelmann

(10) Patent No.: US 11,652,389 B2
(45) Date of Patent: May 16, 2023

(54) GENERATOR WITH TORSIONAL DAMPER

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 309 days.

(21) Appl. No.: 17/144,225

(22) Filed: Jan. 8, 2021

(65) Prior Publication Data

US 2022/0224196 A1 Jul. 14, 2022

(51) Int. Cl.
*H02K 5/24* (2006.01)
*H02K 5/124* (2006.01)
*H02K 7/14* (2006.01)

(52) U.S. Cl.
CPC .............. *H02K 5/24* (2013.01); *H02K 5/124* (2013.01); *H02K 7/14* (2013.01)

(58) Field of Classification Search
CPC ......... F16F 15/161; H02K 5/124; H02K 5/24; H02K 7/10; H02K 7/14
See application file for complete search history.

(56) References Cited

U.S. PATENT DOCUMENTS 2,738,660 A * 3/1956 Gail .......................... F16C 1/00
464/24
2,812,648 A 11/1957 Croset
4,173,158 A * 11/1979 Geislinger ................ F16D 3/80
248/562
2017/0204934 A1* 7/2017 Himmelmann ......... F16F 9/535

FOREIGN PATENT DOCUMENTS

DE 10329216 A1 1/2005
EP 1491784 A1 12/2004
EP 3156326 A2 * 4/2017 ............. B64C 25/34

OTHER PUBLICATIONS

Partial European Search Report for Application No. 21215183.1 dated May 13, 2022.

* cited by examiner

*Primary Examiner* — Naishadh N Desai
(74) *Attorney, Agent, or Firm* — Cantor Colburn LLP

(57) ABSTRACT

A rotor assembly of an electric machine includes a rotor body and a shaft assembly positioned at a central axis of the rotor assembly, and operably connected thereto. The shaft assembly includes a main rotor shaft operably connected to the rotor body, a center drive shaft located inside of the main rotor shaft, and a hydraulic damper sleeve located radially between the main rotor shaft and the center drive shaft. The hydraulic damper sleeve defines a plurality of cavities between the hydraulic damper sleeve and the center drive shaft. The hydraulic damper sleeve is configured to urge a fluid into and out of the plurality of cavities thereby damping relative circumferential motion between the main rotor shaft and the center drive shaft. A plurality of flow restrictors are configured to easily allow fluid into the plurality of cavities, while restricting flow of fluid out of the plurality of cavities.

20 Claims, 8 Drawing Sheets

GENERATOR WITH TORSIONAL DAMPER

BACKGROUND

Exemplary embodiments pertain to the art of electrical power generators for, for example, aircraft.

Aircraft require electrical power for systems such as avionics, flight controls, passenger comfort and various other systems. The necessary electrical power is typically generated by engine-driven generators and by auxiliary power unit (APU) driven generators.

In some operating conditions, a generator may experience a sustained torsional vibration. This torsional vibration, when combined with a spring rate of a center drive shaft of the generator, causes a relative velocity to be generated between a main rotor shaft of the generator and the center drive shaft nested inside of the main rotor shaft.

BRIEF DESCRIPTION

In one embodiment, a rotor assembly of an electric machine includes a rotor body and a shaft assembly positioned at a central axis of the rotor assembly, and operably connected to the rotor body. The shaft assembly includes a main rotor shaft operably connected to the rotor body, a center drive shaft located inside of the main rotor shaft, and a hydraulic damper sleeve located radially between the main rotor shaft and the center drive shaft. The hydraulic damper sleeve defines a plurality of cavities between the hydraulic damper sleeve and the center drive shaft. The hydraulic damper sleeve is configured to urge a fluid into and out of the plurality of cavities thereby damping relative circumferential motion between the main rotor shaft and the center drive shaft. A plurality of flow restrictors are configured to easily allow fluid into the plurality of cavities, while restricting flow of fluid out of the plurality of cavities.

Additionally or alternatively, in this or other embodiments the plurality of flow restrictors is a plurality of reed valves located in the plurality of cavities.

Additionally or alternatively, in this or other embodiments the plurality of flow restrictors is a plurality of conical vent passages extending from the plurality of cavities through the center drive shaft and into a hollow interior of the center drive shaft.

Additionally or alternatively, in this or other embodiments the plurality of conical vent passages each have a first cross-sectional area at the vent passage greater than a second cross-sectional area at the interior of the center drive shaft.

Additionally or alternatively, in this or other embodiments an included angle of the conical vent passage is in the range of 2 to 7 degrees.

Additionally or alternatively, in this or other embodiments a flow disruptor is located in the interior of the center drive shaft.

Additionally or alternatively, in this or other embodiments the flow disruptor is one of a channel or a cup.

Additionally or alternatively, in this or other embodiments the hydraulic damper sleeve includes one or more sleeve vanes extending radially inwardly to the center drive shaft, and the center drive shaft includes one or more shaft vanes extending radially outwardly to the hydraulic damper sleeve. The one or more sleeve vanes and the one or more shaft vanes at least partially define the plurality of cavities.

In another embodiment, an electric machine includes a housing, a stator located in the housing, and a rotor assembly located in the housing and defining an air gap to the stator. The rotor assembly includes a rotor body, and a shaft assembly located at a central axis of the rotor assembly, and operably connected to the rotor body. The shaft assembly includes a main rotor shaft operably connected to the rotor body, a center drive shaft disposed inside of the main rotor shaft, and a hydraulic damper sleeve located radially between the main rotor shaft and the center drive shaft, defining a plurality of cavities between the hydraulic damper sleeve and the center drive shaft. The hydraulic damper sleeve is configured to urge a fluid into and out of the plurality of cavities thereby damping relative circumferential motion between the main rotor shaft and the center drive shaft. A plurality of flow restrictors are configured to easily allow fluid into the plurality of cavities, while restricting flow of fluid out of the plurality of cavities.

Additionally or alternatively, in this or other embodiments the plurality of flow restrictors is a plurality of reed valves located in the plurality of cavities.

Additionally or alternatively, in this or other embodiments the plurality of flow restrictors is a plurality of conical vent passages extending from the plurality of cavities through the center drive shaft and into a hollow interior of the center drive shaft.

Additionally or alternatively, in this or other embodiments the plurality of conical vent passages each have a first cross-sectional area at the vent passage greater than a second cross-sectional area at the interior of the center drive shaft.

Additionally or alternatively, in this or other embodiments an included angle of the conical vent passage is in the range of 2 to 7 degrees.

Additionally or alternatively, in this or other embodiments a flow disruptor is located in the interior of the center drive shaft.

Additionally or alternatively, in this or other embodiments the flow disruptor is one of a channel or a cup.

In another embodiment, a rotor assembly of an electric machine includes a rotor body and a shaft assembly located at a central axis of the rotor assembly, and operably connected to the rotor body. The shaft assembly includes a main rotor shaft operably connected to the rotor body, a center drive shaft located inside of the main rotor shaft and configured for connection to an input shaft for supplying rotational energy to the rotor assembly, and a hydraulic damper sleeve located radially between the main rotor shaft and the center drive shaft, defining a plurality of cavities between the hydraulic damper sleeve and the center drive shaft. The hydraulic damper sleeve is configured to urge a fluid into and out of the plurality of cavities thereby damping relative circumferential motion between the main rotor shaft and the center drive shaft. An articulating shaft is operably connected to the hydraulic damper sleeve and movable in an axial direction with the hydraulic damper sleeve and is displaceable in a radial direction relative to the main rotor shaft.

Additionally or alternatively, in this or other embodiments a set of first pins operably connect the articulating shaft to the hydraulic damper sleeve, a second set of pins are located at the articulating shaft and are selectably engageable to a shaft grounding ring installed to the main rotor shaft.

Additionally or alternatively, in this or other embodiments the second set of pins is engageable with a plurality of slots in the shaft grounding ring.

Additionally or alternatively, in this or other embodiments when a disconnect command is initiated to disconnect the center drive shaft from the input shaft, the second set of pins are disengaged from the shaft grounding ring via axial translation of the articulating shaft.

Additionally or alternatively, in this or other embodiments the hydraulic damper sleeve includes one or more sleeve vanes extending radially inwardly to the center drive shaft, and the center drive shaft includes one or more shaft vanes extending radially outwardly to the hydraulic damper sleeve. The one or more sleeve vanes and the one or more shaft vanes at least partially define the plurality of cavities.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
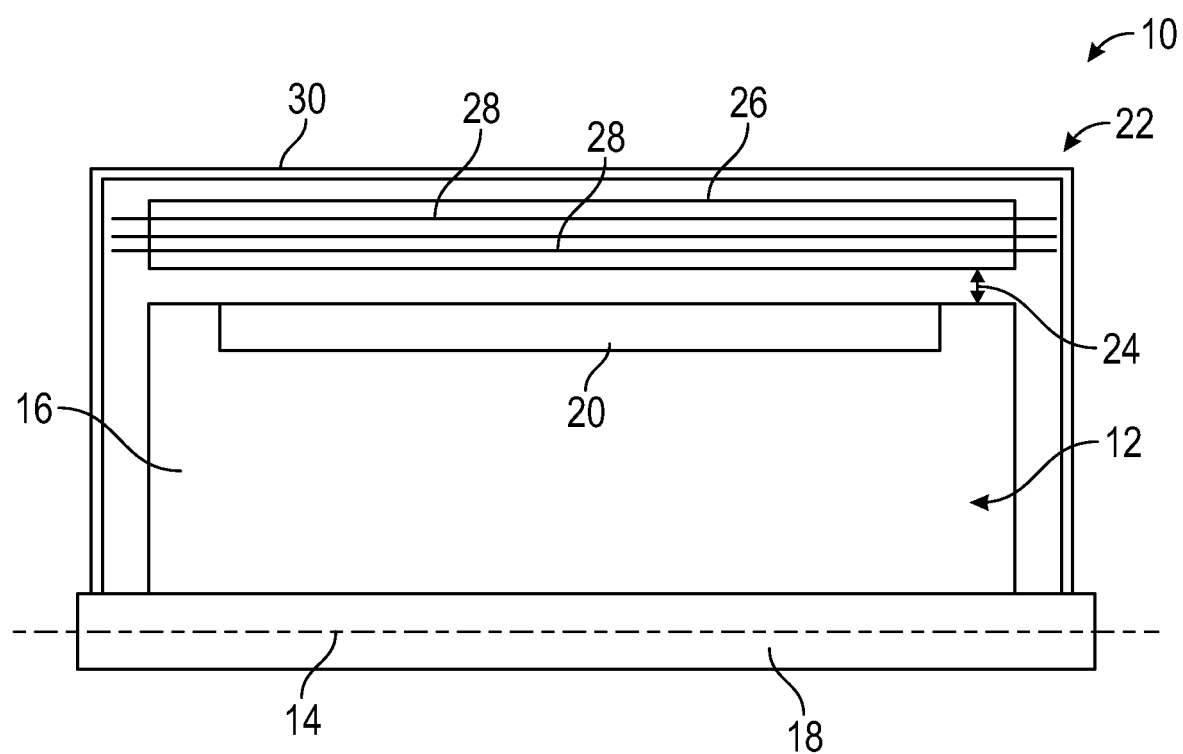
FIG. 1 is a schematic illustration of an embodiment of an electric machine.

Referring now to FIG. 1, illustrated is a schematic view of an embodiment of an electric machine 10. The electric machine 10 includes a rotor assembly 12 configured to rotate about a machine central axis 14. In some embodiments, the rotor assembly 12 includes a rotor body 16, and a rotor shaft assembly 18 located at the machine central axis 14. In some embodiments, the electric machine 10 is a permanent magnet electric machine with a plurality of permanent magnets 20 located at the rotor body 16. In other embodiments (not illustrated), the electric machine 10 is a wound field electric machine with a plurality of rotor coils located at the rotor body. A stator 22 is located radially outboard of the rotor assembly 12 defining a radial air gap 24 between the stator 22 and the rotor assembly 12. The stator 22 includes a stator core 26 and a plurality of stator windings 28 extending through the stator core 26 which are magnetically interactive with the rotor assembly 12. The rotor assembly 12 and stator 22 are located inside of a housing 30 which seals the electric machine 10 from the outside environment. The rotor shaft assembly 18 incorporates a damper sleeve 46, further discussed with reference to FIGS. 3 and 4, that addresses the torsional vibration experienced by prior generators.

In some embodiments, the electric machine 10 is configured as a generator, in which rotational energy is input into the rotor assembly 12, which energizes the stator windings 28 via electromagnetic interaction between the rotor assembly 12 and the stator windings 28 across the air gap 24.

Figure 2:
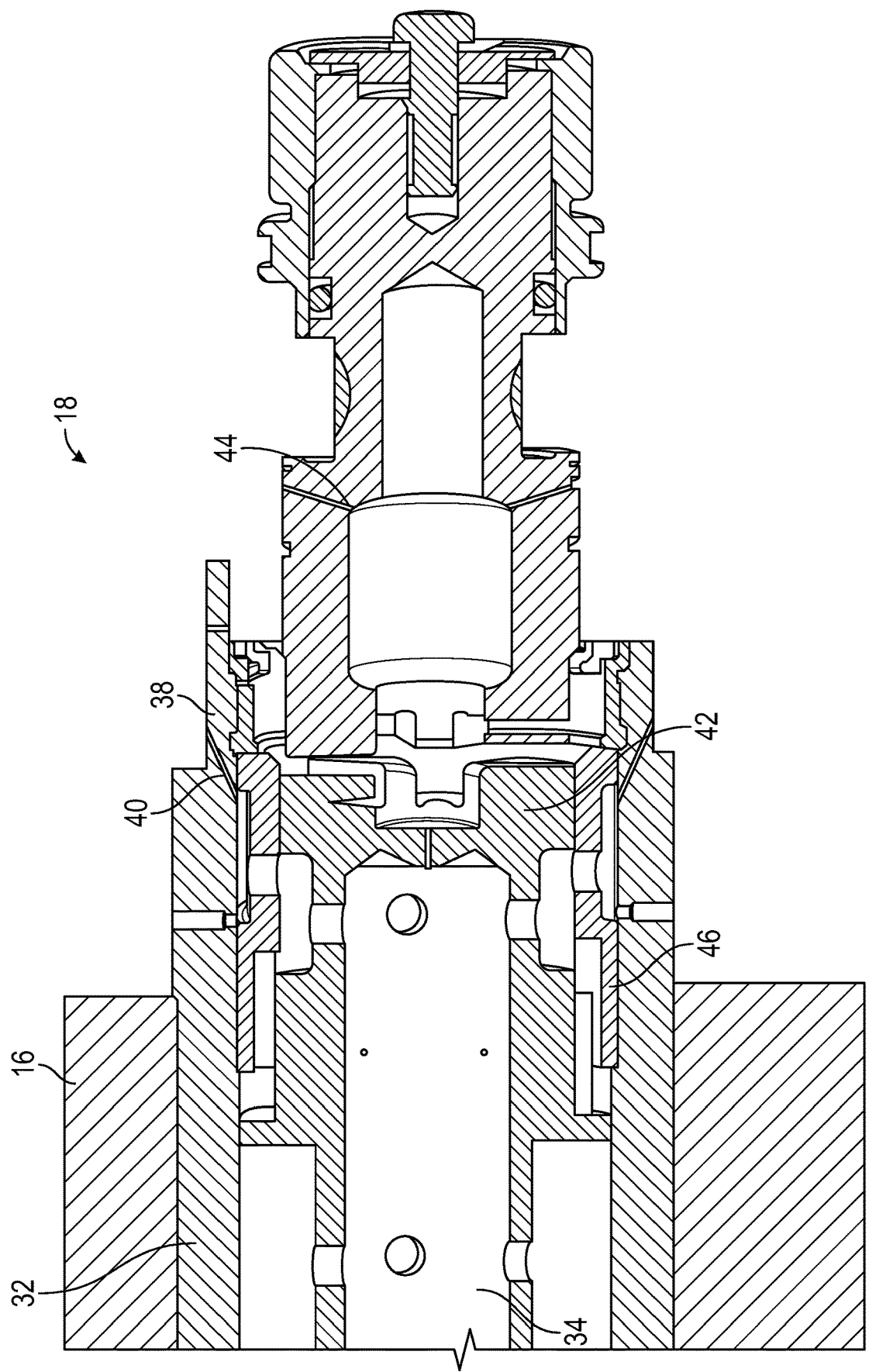
FIG. 2 is a partial cross-sectional view of an embodiment of an electric machine.

Referring to FIG. 2, the rotor shaft assembly 18 includes a main rotor shaft 32 from which the rotor body 16 extends, and a center drive shaft 34 located inside the main rotor shaft 32 and extending along a length of the main rotor shaft 32. The center draft shaft 34 is secured to the main rotor shaft 32 at a second end (not shown) of the center drive shaft 34 opposite a first shaft end 40.

Further, the center drive shaft 34 includes one or more connection features 42 at the first shaft end 40, such that the center drive shaft 34 is selectably connectible to and disconnectible from an input shaft 44, which transfers rotational energy from, for example, a gas turbine engine (not shown) to drive rotation of the rotor assembly 12.

Figure 3:
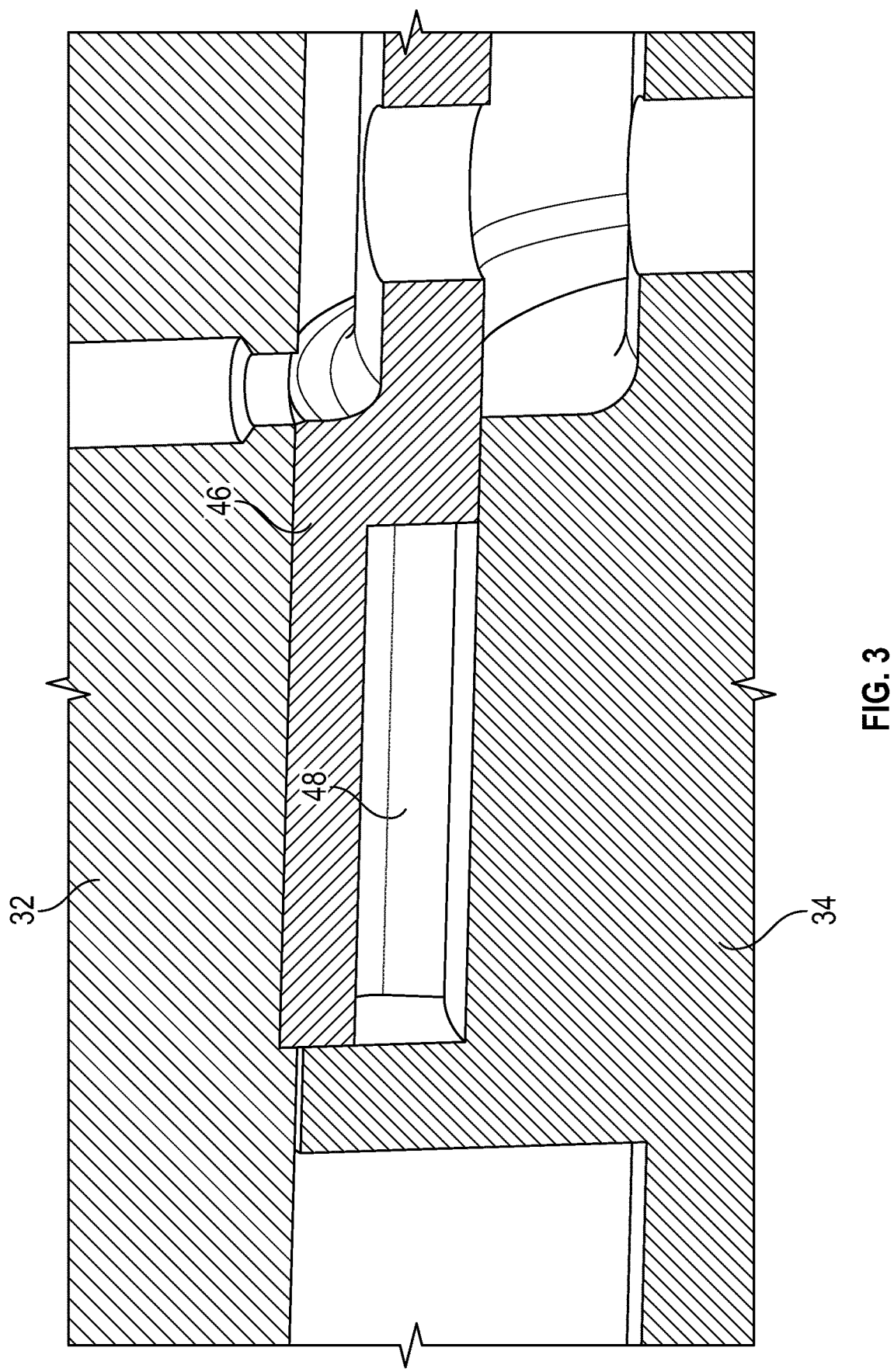
FIG. 3 is a cross-sectional view of an embodiment of a shaft assembly with a hydraulic damper sleeve.
Figure 4:
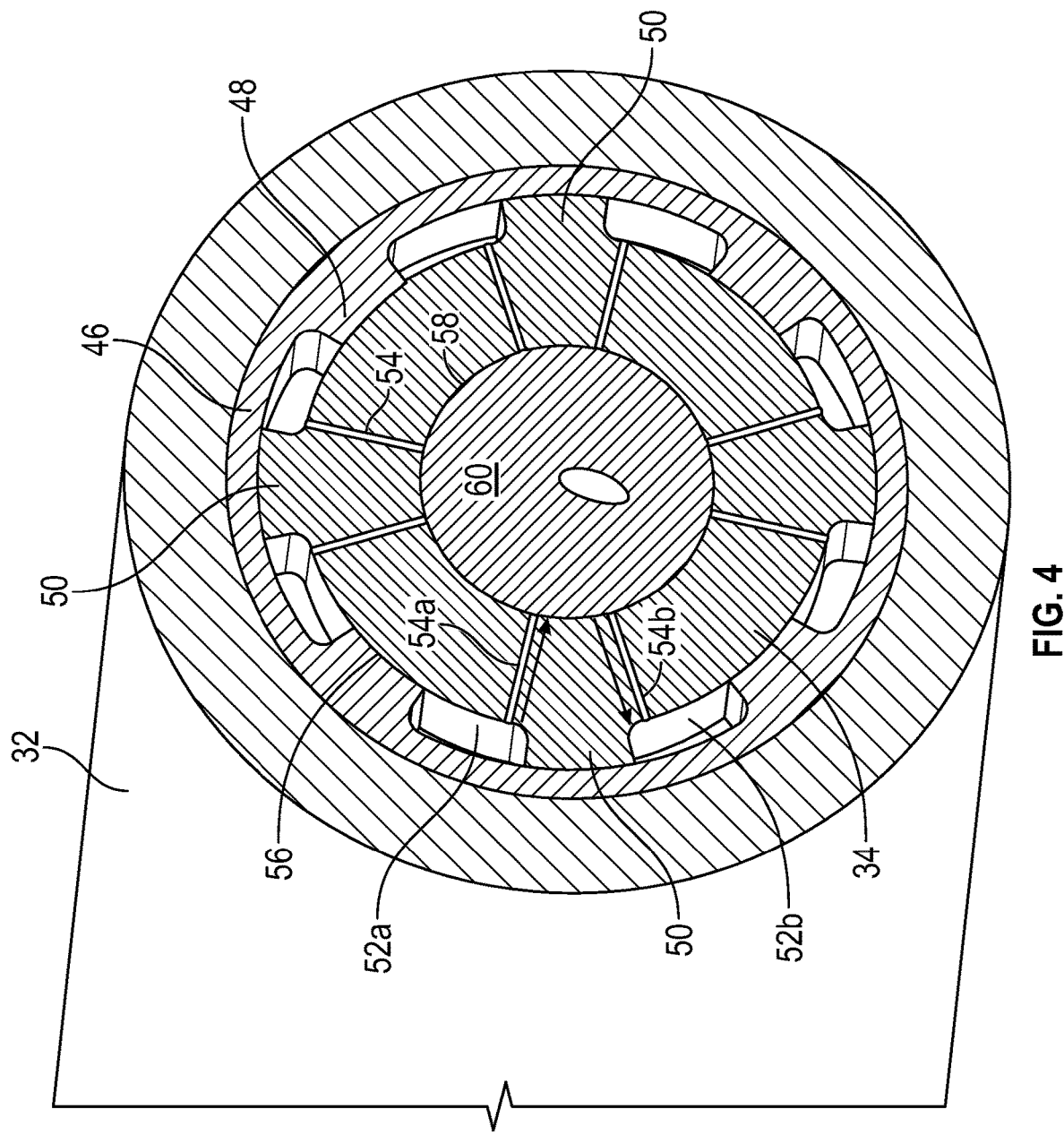
FIG. 4 is a perspective view of an embodiment of a shaft assembly with a hydraulic damper sleeve.

Referring now to FIGS. 3 and 4, the rotor shaft assembly 18 further includes a hydraulic damper sleeve 46 press fit into the main rotor shaft 32 between the main rotor shaft 32 and the center drive shaft 34, with a tight clearance fit to the center drive shaft 34. The damper sleeve 46 may be further retained in place by a retention nut 38 installed to the main rotor shaft 32. The hydraulic damper sleeve 46 includes a number of sleeve vanes 48 which extend radially inwardly to the center drive shaft 34, and the center drive shaft 34 similarly includes a number of shaft vanes 50 extending radially outwardly to the damper sleeve 46. The shaft vanes 50 are circumferentially offset from the sleeve vanes 48 and define a plurality of cavities 52 between circumferentially adjacent sleeve vanes 48 and shaft vanes 50. The center drive shaft 34 includes a plurality of vent passages 54 extending from a shaft outer surface 56 and through a shaft inner surface 58 to a hollow center drive shaft interior 60. The plurality of cavities 52 and the shaft interior 60 have a volume of fluid, for example, oil, located therein.

As shown in FIG. 4, in some operating conditions, the main rotor shaft 32 and the center drive shaft 34 have a relative velocity. As the center drive shaft 34 rotates relative to the main rotor shaft 32, fluid is forced out of a first cavity 52a via a first vent passage 54a and into the shaft interior 60. While this is occurring, fluid is also backfilling second cavity 52b, by flowing from the shaft interior 60 and through a second vent passage 54b. As the fluid is forced through the vent passages 54, energy is absorbed through viscous drag. This energy absorption provides a damping force, this damping the relative motion of the center drive shaft 34 and the main rotor shaft 32.

Figure 5:
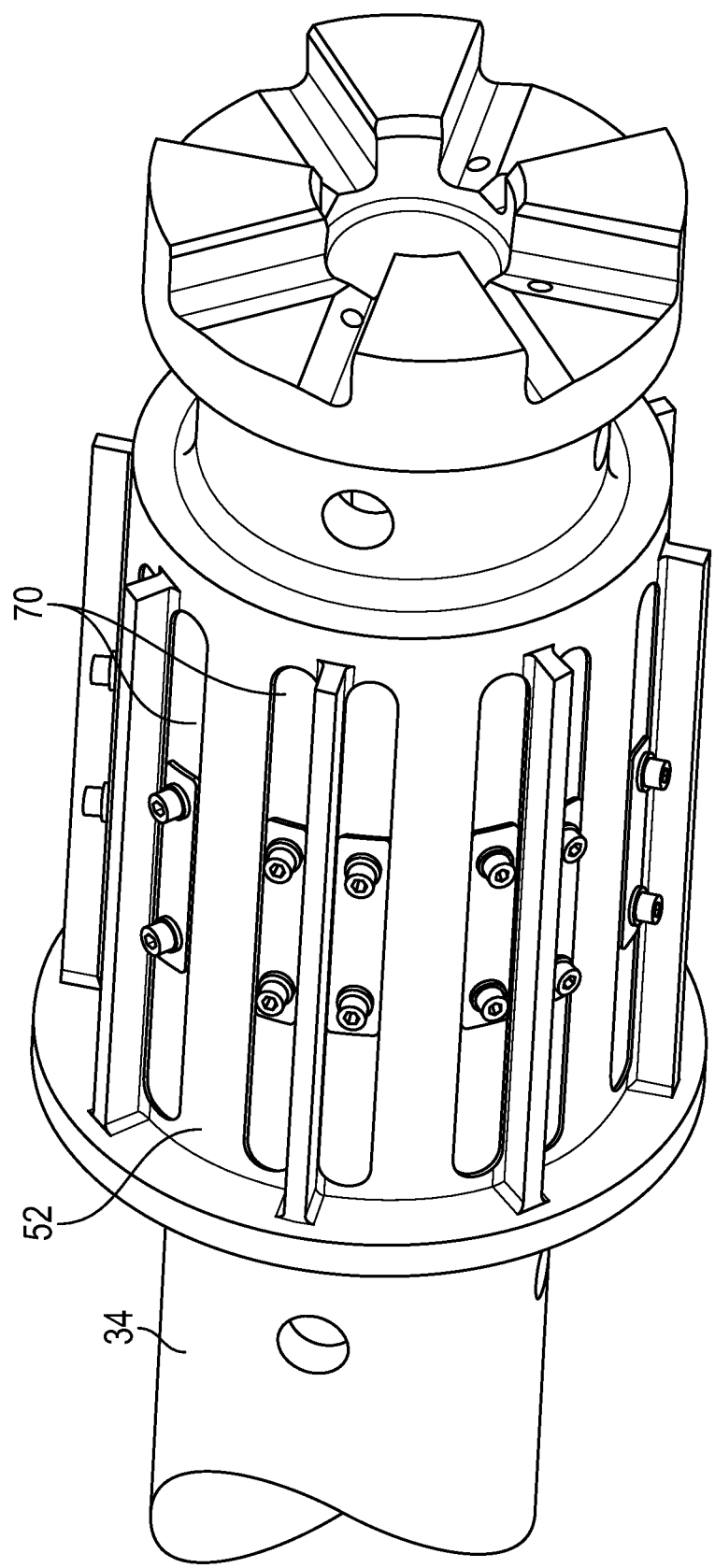
FIG. 5 is a perspective view of an embodiment of a hydraulic damper with a flow restrictor.
Figure 6:
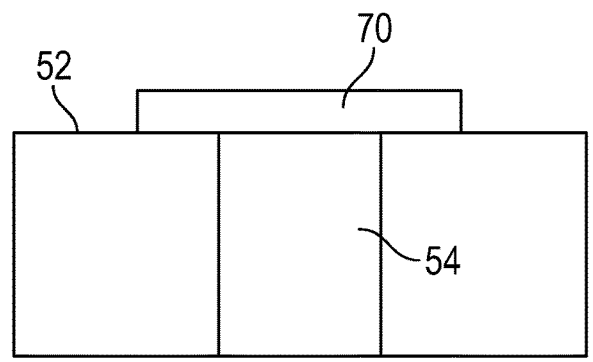
FIG. 6 is a cross-sectional view of the embodiment of FIG. 5.

Under some conditions, the backfilling second cavity 52b may be subjected to cavitation due to the flow restrictions along the vent passages 54. Thus one or more flow restrictors may be provided to bias the bi-directional flow, allowing for ease of flow into the cavities 52b via the vent passages 54b, while restricting flow from the cavities 52a into the vent passages 54a. For example, in the embodiment illustrated in FIGS. 5 and 6, one or more reed valves 70 are located in the cavities 52, extending over the vent passages 54. The reed valves 70 are configured to easily allow flow into the cavities 52 via the vent passages 54, while restricting flow from the cavities 52. This embodiment allows flow to easily enter cavity 52, eliminating any risk of cavitation, while prohibiting flow from leaving cavity 52, allowing for a high level of torsional damping.

Figure 7:
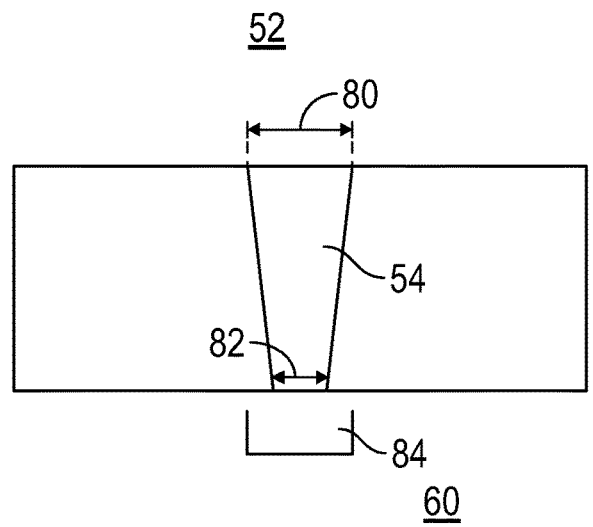
FIG. 7 is a cross-sectional view of an embodiment of a hydraulic damper with a flow restrictor.

Another embodiment is illustrated in FIG. 7. In this embodiment, flow from the cavities 52 is restricted by forming the vent passages 54 with a conical configuration. As illustrated, the vent passages 54 each have a first diameter 80 at the cavity 52, which is greater than a second diameter 82 at a location away from the cavity 52, for example at the shaft interior 60. This shape of the vent passages 54 acts as a diffuser for the flow of fluid into the cavities thus increasing the mass flow rate thereof, while restricting the flow of fluid from the cavities 52 due to the tapering cross-sectional area in that direction. In some embodiments, the included angle of the vent passages 54 is in the range of 2 to 7 degrees. In some embodiments, the diffusion angle extends along an entire length of the vent passage 54, while in other embodiments the diffusion angle extends only partly along the vent passage 54 length.

Figure 8:
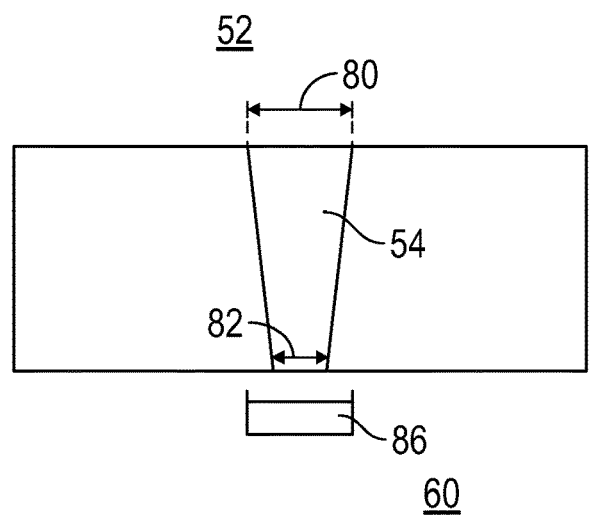
FIG. 8 is a cross-sectional view of another embodiment of a hydraulic damper with a flow restrictor.

Further, in some embodiments, a channel 84 is installed in the shaft interior 60 such that fluid flow leaving the vent passages 54 at the shaft interior impinges on the channel 84, thus disrupting the fluid flow leaving the vent passages 54. In another embodiment, as illustrated in FIG. 8, receptacle cups 86 are utilized instead of the channel 84 to disrupt the fluid flow leaving the vent passages 54.

Figure 9:
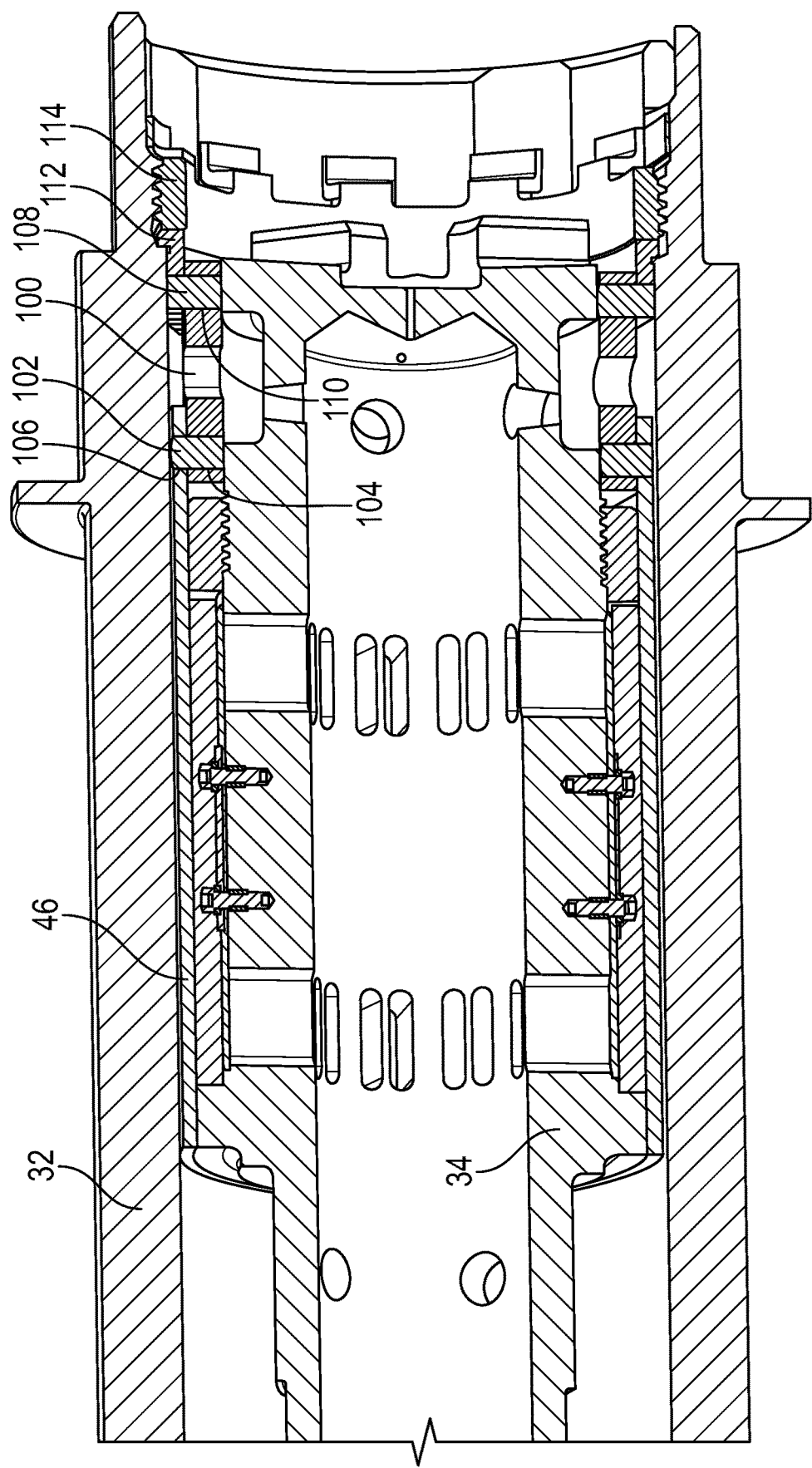
FIG. 9 is a cross-sectional view of an embodiment of a shaft assembly with an articulating shaft.

Referring now to FIG. 9, the damper sleeve 46 and thus the center drive shaft 34 may be displaced in a radial direction relative to the main rotor shaft 32, in some embodiments up to about 0.0125 inches. Thus, an articulating arrangement is utilized to ensure radial alignment of the center drive shaft 34 to the input shaft 44 for connection of the input shaft 44 to the center drive shaft 34.

The arrangement includes an articulating shaft 100 located radially between the main rotor shaft 32 and the center drive shaft 34. The articulating shaft 100 is connected to the damper sleeve 46 via a set of first drive pins 102. The first drive pins 102 are arrayed about the circumference of the center drive shaft 34 and extend through first shaft openings 104 in the articulating shaft 100 and through sleeve openings 106 in the damper sleeve 46, thus connecting the articulating shaft 100 to the damper sleeve 46. A set of second drive pins 108 are axially offset from the first drive pins 102 and extend through second shaft openings 110 in the articulating shaft 100. The arrangement further includes an articulating shaft grounding ring 112 and an articulating shaft locking nut 114, which is installed via a threaded connection to the main rotor shaft 32.

Figure 10:
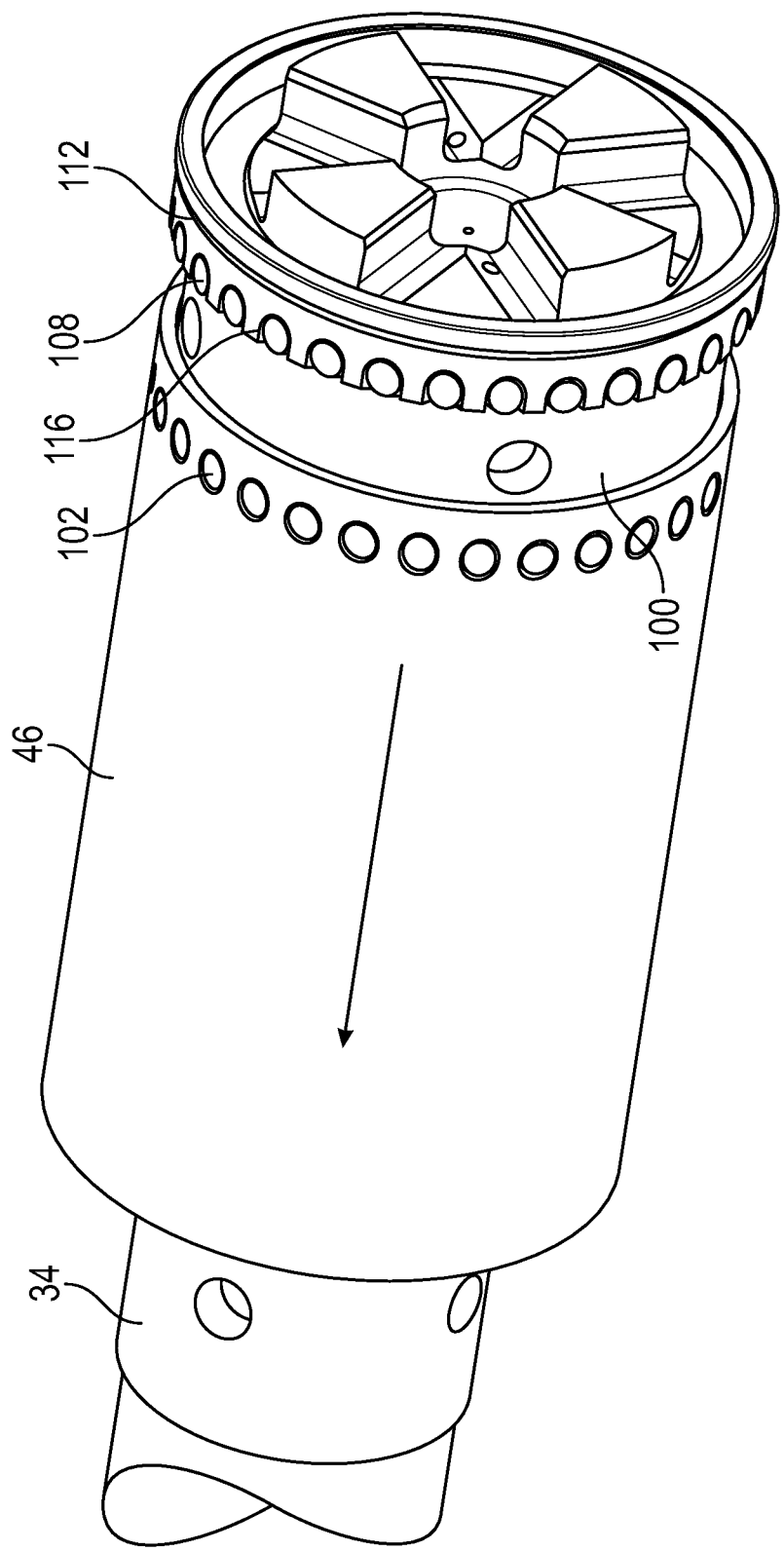
FIG. 10 is a perspective view of an embodiment of a shaft assembly with an articulating shaft.

As shown in FIG. 10, the shaft grounding ring 112 includes a plurality of ring slots 116, which the second drive pins 108 engage when the center drive shaft 34 is positioned for engagement with the input shaft 44. Via the connection through the first drive pins 102 and the second drive pins 108, the articulating shaft 100 and thus the center drive shaft 34 is radially movable relative to the damper sleeve 46 and the shaft grounding ring 112. This allows for effective connection to the input shaft 44 even when the damper sleeve 46 is radially displaced, and also allows for disconnection of the center drive shaft 34 from the input shaft 44.

As illustrated in FIG. 10, when a disconnect command is initiated, the center drive shaft 34 translates axially to a disconnect position, relative to the main rotor shaft 32. The damper sleeve 46 translates with the center drive shaft 34 and thereby translates the articulating shaft 100 due to the connection of the damper sleeve 46 to the articulating shaft 100 via the first drive pins 102. The translation of the articulating shaft 100 then brings the second drive pins 108 out of engagement with the shaft grounding ring 112.

The hydraulic damper sleeve 46 disclosed herein is retrofittable into existing electric machines 10, with only slight modifications to the main rotor shaft 32 and center drive shaft 34, and still allows for connectibility of the center drive shaft 34 to the input shaft 44, and does not require other modification of the rotor assembly 12 to incorporate the hydraulic damper sleeve 46.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor assembly of an electric machine, comprising:
    a rotor body;
    a shaft assembly disposed at a central axis of the rotor assembly, and operably connected to the rotor body, the shaft assembly including:
        a main rotor shaft operably connected to the rotor body;
        a center drive shaft disposed inside of the main rotor shaft;
        a hydraulic damper sleeve disposed radially between the main rotor shaft and the center drive shaft, defining a plurality of cavities between the hydraulic damper sleeve and the center drive shaft, the hydraulic damper sleeve configured to urge a fluid into and out of the plurality of cavities thereby damping relative circumferential motion between the main rotor shaft and the center drive shaft; and
        a plurality of flow restrictors configured to easily allow fluid into the plurality of cavities, while restricting flow of fluid out of the plurality of cavities.

2. The rotor assembly of claim 1, wherein the plurality of flow restrictors is a plurality of reed valves disposed in the plurality of cavities.

3. The rotor assembly of claim 1, wherein the plurality of flow restrictors is a plurality of conical vent passages extending from the plurality of cavities through the center drive shaft and into a hollow interior of the center drive shaft.

4. The rotor assembly of claim 3, wherein the plurality of conical vent passages each have a first cross-sectional area at the vent passage greater than a second cross-sectional area at the interior of the center drive shaft.

5. The rotor assembly of claim 3, wherein an included angle of the conical vent passage is in the range of 2 to 7 degrees.

6. The rotor assembly of claim 3, further comprising a flow disruptor disposed in the interior of the center drive shaft.

7. The rotor assembly of claim 6, wherein the flow disruptor is one of a channel or a cup.

8. The rotor assembly of claim 1, wherein:
the hydraulic damper sleeve includes one or more sleeve vanes extending radially inwardly to the center drive shaft;
the center drive shaft includes one or more shaft vanes extending radially outwardly to the hydraulic damper sleeve; and
the one or more sleeve vanes and the one or more shaft vanes at least partially define the plurality of cavities.

9. An electric machine, comprising:
a housing;
a stator disposed in the housing; and
a rotor assembly disposed in the housing and defining an air gap to the stator, the rotor assembly including:
a rotor body;
a shaft assembly disposed at a central axis of the rotor assembly, and operably connected to the rotor body, the shaft assembly including:
a main rotor shaft operably connected to the rotor body;
a center drive shaft disposed inside of the main rotor shaft;
a hydraulic damper sleeve disposed radially between the main rotor shaft and the center drive shaft, defining a plurality of cavities between the hydraulic damper sleeve and the center drive shaft, the hydraulic damper sleeve configured to urge a fluid into and out of the plurality of cavities thereby damping relative circumferential motion between the main rotor shaft and the center drive shaft; and
a plurality of flow restrictors configured to easily allow fluid into the plurality of cavities, while restricting flow of fluid out of the plurality of cavities.

10. The electric machine of claim 9, wherein the plurality of flow restrictors is a plurality of reed valves disposed in the plurality of cavities.

11. The electric machine of claim 9, wherein the plurality of flow restrictors is a plurality of conical vent passages extending from the plurality of cavities through the center drive shaft and into a hollow interior of the center drive shaft.

12. The electric machine of claim 11, wherein the plurality of conical vent passages each have a first cross-sectional area at the vent passage greater than a second cross-sectional area at the interior of the center drive shaft.

13. The electric machine of claim 11, wherein an included angle of the conical vent passage is in the range of 2 to 7 degrees.

14. The electric machine of claim 11, further comprising a flow disruptor disposed in the interior of the center drive shaft.

15. The electric machine of claim 14, wherein the flow disruptor is one of a channel or a cup.

16. A rotor assembly of an electric machine, comprising:
a rotor body;
a shaft assembly disposed at a central axis of the rotor assembly, and operably connected to the rotor body, the shaft assembly including:
a main rotor shaft operably connected to the rotor body;
a center drive shaft disposed inside of the main rotor shaft and configured for connection to an input shaft for supplying rotational energy to the rotor assembly;
a hydraulic damper sleeve disposed radially between the main rotor shaft and the center drive shaft, defining a plurality of cavities between the hydraulic damper sleeve and the center drive shaft, the hydraulic damper sleeve configured to urge a fluid into and out of the plurality of cavities thereby damping relative circumferential motion between the main rotor shaft and the center drive shaft; and
an articulating shaft operably connected to the hydraulic damper sleeve and movable in an axial direction with the hydraulic damper sleeve and which is displaceable in a radial direction relative to the main rotor shaft.

17. The rotor assembly of claim 16, further comprising:
a set of first pins operably connecting the articulating shaft to the hydraulic damper sleeve; and
a second set of pins disposed at the articulating shaft and selectably engageable to a shaft grounding ring installed to the main rotor shaft.

18. The rotor assembly of claim 17, wherein the second set of pins is engageable with a plurality of slots in the shaft grounding ring.

19. The rotor assembly of claim 18, wherein when a disconnect command is initiated to disconnect the center drive shaft from the input shaft, the second set of pins are disengaged from the shaft grounding ring via axial translation of the articulating shaft.

20. The rotor assembly of claim 16, wherein:
the hydraulic damper sleeve includes one or more sleeve vanes extending radially inwardly to the center drive shaft;
the center drive shaft includes one or more shaft vanes extending radially outwardly to the hydraulic damper sleeve; and
the one or more sleeve vanes and the one or more shaft vanes at least partially define the plurality of cavities.

* * * * *